G. F. ACKERMAN.
MACHINE FOR FORMING FORGED RINGS.
APPLICATION FILED JAN. 15, 1920.
1,432,228.
Patented Oct. 17, 1922.
2 SHEETS—SHEET 1.
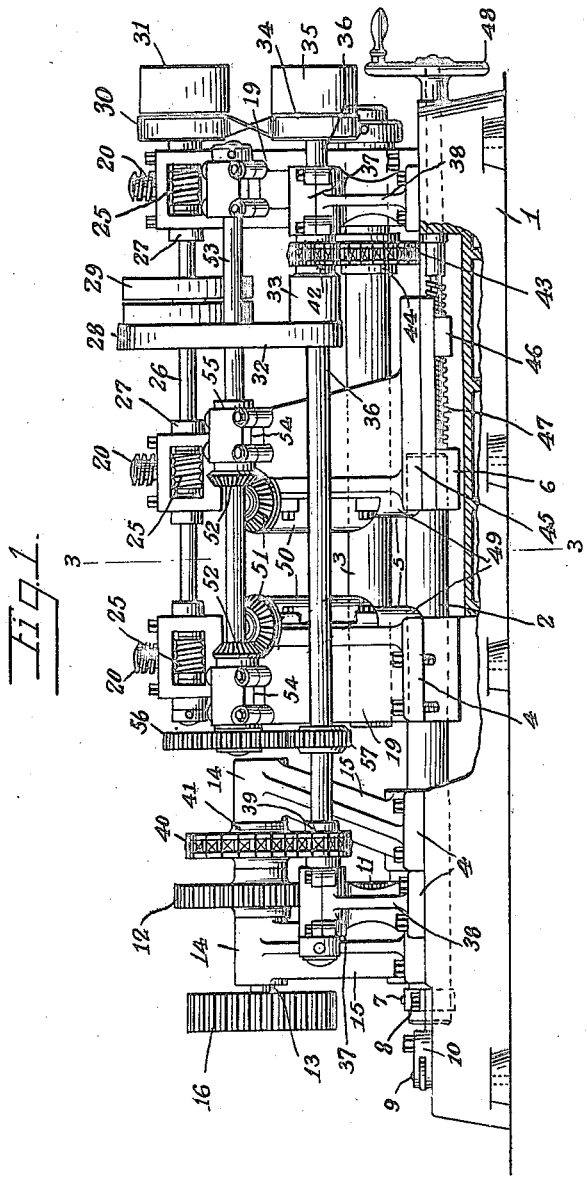
George F. Ackerman
Inventor.

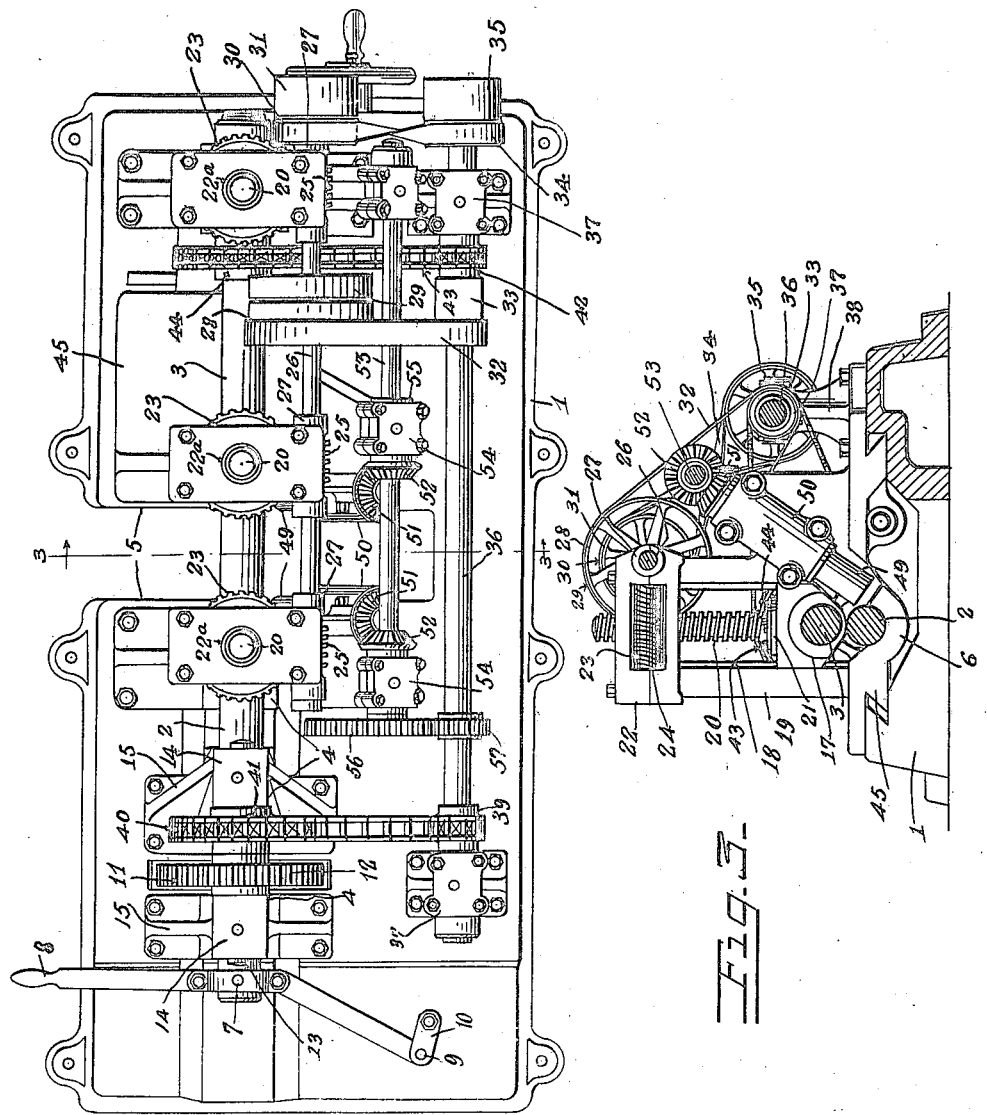

Patented Oct. 17, 1922.

1,432,228

UNITED STATES PATENT OFFICE.

GEORGE F. ACKERMAN, OF ERIE, PENNSYLVANIA.

MACHINE FOR FORMING FORGED RINGS.

Application filed January 15, 1920. Serial No. 351,610.

*To all whom it may concern:*

Be it known that I, GEORGE F. ACKERMAN, a citizen of the United States, residing at Erie, in the county of Erie and State of Pennsylvania, have invented new and useful Improvements in a Machine for Forming Forged Rings, of which the following is a specification.

This invention is designed to form rings for man-holes and the like.

The machine is illustrated in the accompanying drawings as follows:—

Fig. 1 shows a front elevation of the machine.

Fig. 2 a plan view of the machine.

Fig. 3 a section on the lines 3—3 in Figs. 1 and 2.

1 marks the base, or frame of the machine. It is provided with the swaging rolls 2 and 3. The swaging roll 2 is journaled in bearings 4 and its end extends across the swage opening 5 in the frame and rests in the bearing 6. A lever 8 has a swivel connection 7 with the end of the shaft 2. The lever 8 is pivotally mounted on a pin 9 carried by a bracket 10 on the frame. The shaft 2 is slidingly mounted in its bearing and by means of the lever it may be moved axially so as to open the pass between the rolls 2 and 3 and thus permit the insertion of a blank ring. A gear 11 is mounted on the shaft 2 and is arranged to drive the shaft 2 while permitting the shaft to slide through it. The gear 11 meshes with a gear 12 fixed on the shaft 13. The shaft 13 is mounted in bearings 14 carried by the posts 15 extending upwardly from the frame. The shaft 13 is driven by a gear 16 from any convenient source of power. The shaft 3 is mounted in the bearings 17. The bearings 17 are slidingly mounted in the guides 18 carried by the uprights 19 and 19ª. A screw 20 has a flange plate 21 at its lower end which is secured to the bearing 17. The screw extends through openings 22ª in a head 22 at the upper ends of the uprights 19 and 19ª. A worm gear 23 is arranged in a slot 24 in the head, the worm gear being screw-threaded but mounted on the screw 20 so that when the worm gear is turned it operates on the screw 20 to raise or lower the bearing 17. A worm 25 is mounted on the shaft 26 and meshes with the worm gear 23. The shaft is mounted in bearings 27 in the head 22. There are three of the uprights or posts 19 and three sets of the mechanism such as just described so that the shaft 3 has three bearings which are lifted simultaneously with the turning of the shaft 26. The shaft 26 is provided with tight and loose pulleys 28, 29, 30 and 31. A belt 32 extends from the pulley 28 to a pulley 33 on a shaft 36 and a belt 34 extends from the pulley 30 to a pulley 35 also mounted on the shaft 36. The belt 34 is a twist belt so as to run the shaft 26 in a reverse direction from that of the belt 32. An ordinary shifter is provided for the belts 32 and 34 and through its operation the shaft 26 may be turned in either direction and thus force the shaft 3 toward and from the shaft 2 and this may be accomplished as the machine is operated. The shaft 36 is journaled in bearings 37 carried in posts 38 extending upwardly from the base. A sprocket 39 is mounted on the shaft 36 and a sprocket chain 40 extends from the sprocket 39 to a sprocket 41 on the drive shaft 13.

A sprocket 42 is fixed on the shaft 36 and a sprocket chain 43 extends from the sprocket 42 to a sprocket 44 on the shaft 3. This chain extends in a general direction at right angles to the line of movement of the shaft 3 and the slack of the chain permits of the up and down movement of the shaft as the machine operates without adjustment of the chain.

One of the posts 19 has a sliding base 45 mounted on the frame. Screw-threaded blocks 46 are arranged on the underside of the sliding base and a screw 47 operates through these blocks. A hand wheel 48 is provided for the screw 47. By means of this the upright may be adjusted toward or from the opposing upright thus permitting of a wider or narrower ring and also permitting of adjustment between the side swage rolls hereinafter described.

The side swaging rolls 49 are carried by bearings 50 mounted on the uprights 19. They are in position to form a part of the pass and to receive the ring as it comes from between the rolls 2 and 3, thus swaging the sides of the ring. The gears 51 are secured to the rolls 49. These gears mesh with gears 52 mounted on a shaft 53. The shaft 53 is carried by bearings 54 on the uprights 19. The gear on the adjustable upright is slidingly mounted on the shaft 53 but locked against rotation thereon and the hub 55 of this gear 52 operates in the bearing. A gear 56 is fixed on the end of the shaft 53 and meshes with a gear 57 on the shaft 36. In this manner the rolls 49 are driven as the rolls 2 and 3 are driven. By following the connection it will be noted that the direction of rotation of the rolls is in harmony to advance the ring as it is swaged.

The initial ring blank may be formed in any desirable manner. In forming a ring I preferably use stock bars of comparatively small diameter. These bars are drilled so as to make an initial opening at the center and then cut off in such lengths as to give the desired dimension. This block so cut is heated and the central opening enlarged by drifting so that the hole in the blank thus formed will be of sufficient size to receive the roll 2. The blank is then heated and placed in the machine.

In the operation of the machine the blank formed as described is placed in the pass. To accomplish this the roll 2 is moved axially by means of the lever 8 and the ring blank put in place. The roll 3 is then moved against the ring by shifting the belts 32 and 34. The side rolls are fed up to the work by means of the screw 47. These adjustments are made as the swaging progresses.

The swaging operation is continuous and what is of great importance is that the ring may be so rapidly formed and expanded to its final shape that it may be completed from the ring blank in a single operation. By making the original piece of the proper weight the right amount of metal to give to the final ring its proper dimensions is assured.

What I claim as new is:—

1. In a ring swaging machine, the combination of two swaging rolls; bearings for said rolls; means for moving one roll axially to open the pass for the insertion of a ring blank; and a power driven means for driving said swaging rolls and for moving one of said rolls toward the other of said rolls.

2. In a ring swaging machine, the combination of two swaging rolls; bearings for said rolls; means for moving one roll axially to open the pass for the insertion of a ring blank; and a power driven means for driving said swaging rolls and for moving one of said rolls toward and from the other of said rolls.

3. In a ring swaging machine, the combination of two swaging rolls; bearings for said rolls; means for moving one roll axially to open the pass for the insertion of a ring blank, and side swage rolls acting on the sides of the blank.

4. In a ring swaging machine, the combination of two swaging rolls; bearings for said rolls; means for moving one roll axially to open the pass for the insertion of a ring blank; and side swage rolls having unobstructed ends permitting the insertion of the blank in the pass between said side swaging rolls.

5. In a ring swaging machine, the combination of two swaging rolls; bearings for said rolls; means for moving one roll axially to open the pass for the insertion of a ring blank; side swage rolls acting on the sides of the blank; and means for moving one of said side swage rolls relatively to the other.

6. In a ring swaging machine, the combination of two swaging rolls; bearings for said rolls; means for moving one roll axially to open the pass for the insertion of a ring blank; side swage rolls acting on the sides of the blank; and means for moving one of said swage rolls relatively to the other as the swaging progresses.

In testimony whereof I have hereunto set my hand.

GEORGE F. ACKERMAN.